US008292329B2

(12) United States Patent
Singh

(10) Patent No.: US 8,292,329 B2
(45) Date of Patent: Oct. 23, 2012

(54) SEAT BELT FOR DOGS AND CATS CONFIGURED TO COUPLE TO BOTH A BUCKLE AND A PRONG OF A VEHICLE SEATBELT SYSTEM TO PROTECT THEM DURING TRAVEL IN A VEHICLE

(76) Inventor: Sanjeev Kumar Singh, Danbury, CT (US)

( * ) Notice: Subject to any disclaimer, the term of this patent is extended or adjusted under 35 U.S.C. 154(b) by 0 days.

(21) Appl. No.: 13/241,695

(22) Filed: Sep. 23, 2011

(65) Prior Publication Data

US 2012/0055418 A1 Mar. 8, 2012

Related U.S. Application Data

(63) Continuation of application No. 12/916,184, filed on Oct. 29, 2010, now Pat. No. 8,056,927.

(51) Int. Cl.
*B60R 22/10* (2006.01)
(52) U.S. Cl. ....................................................... 280/806
(58) Field of Classification Search ............... 280/801.1, 280/806; *A01K 270/00, 29/00; B60R 22/10*
See application file for complete search history.

(56) References Cited

U.S. PATENT DOCUMENTS

| | | | | |
|---|---|---|---|---|
| 3,310,034 A | * | 3/1967 | Dishart | 119/771 |
| 3,576,056 A | * | 4/1971 | Barcus | 24/638 |
| 4,226,474 A | * | 10/1980 | Rupert et al. | 297/484 |
| 4,366,604 A | * | 1/1983 | Anthony et al. | 24/323 |
| 4,679,852 A | * | 7/1987 | Anthony et al. | 297/464 |
| 4,817,562 A | * | 4/1989 | Giroux | 119/771 |
| 4,970,991 A | * | 11/1990 | Luce | 119/771 |
| 5,154,660 A | * | 10/1992 | Snyder et al. | 119/771 |
| 5,167,203 A | * | 12/1992 | Scott et al. | 119/771 |
| 5,836,656 A | * | 11/1998 | Baggott | 297/467 |
| 5,915,335 A | * | 6/1999 | Holt, Jr. | 119/771 |
| 6,033,029 A | * | 3/2000 | Henshall | 297/468 |
| D424,761 S | * | 5/2000 | Mortenson | D30/152 |
| 6,192,835 B1 | * | 2/2001 | Calhoun et al. | 119/792 |
| 6,564,749 B1 | * | 5/2003 | Dorsey | 119/771 |
| 6,637,377 B2 | * | 10/2003 | Lobanoff et al. | 119/792 |
| 7,699,348 B2 | * | 4/2010 | Singh | 280/801.1 |
| 2004/0025804 A1 | * | 2/2004 | Smith et al. | 119/792 |

* cited by examiner

*Primary Examiner* — Paul N Dickson
*Assistant Examiner* — Nicole Verley
(74) *Attorney, Agent, or Firm* — Sanjeev K. Singh

(57) ABSTRACT

A seat belt for dogs and cats is configured to couple to both a buckle and a prong of a vehicle seat belt system. In one embodiment, a detachable seat belt kit comprises a restraint strap having a coupling member and a harness having a securing member which is configured to couple to the coupling member. The harness includes a first connector and a second connector adapted to releasably couple to a first prong and a first buckle of a shoulder/lap belt combination seat belt system respectively. The harness further includes a first harness portion between a first harness end and a second harness end. The first harness portion includes a first intermediate point at which the securing member is affixed. The restraint strap includes a second intermediate point where the coupling member is affixed.

20 Claims, 7 Drawing Sheets

SEAT BELT FOR DOGS AND CATS CONFIGURED TO COUPLE TO BOTH A BUCKLE AND A PRONG OF A VEHICLE SEATBELT SYSTEM TO PROTECT THEM DURING TRAVEL IN A VEHICLE

CROSS REFERENCE TO RELATED APPLICATIONS

This application is a continuation application of U.S. Ser. No. 12/916,184, filed Oct. 29, 2010, which is a continuation application of U.S. Ser. No. 11/951,575, filed Dec. 6, 2007, which is a continuation-in-part of U.S. patent application Ser. No. 11/852,714, filed on Sep. 10, 2007 (now a U.S. Pat. No. 7,699,348), all of which are incorporated by reference herein in their entirety.

BACKGROUND OF THE INVENTION

1. Field of the Invention

This invention relates generally to a safety restrainer for use in a vehicle for securing a pet and more particularly pertains to pet safety for controllably restraining a pet during a collision or sudden braking when traveling in the vehicle having a seat belt with a buckle and a prong.

2. Description of the Related Art

Pet ownership is on the rise and so is their need for well-being, health and safety. According to a 2007-2008 National Pet Owners Survey by the American Pet Product Manufacturers Association (APPMA), 63% of United States (U.S.) households own a pet, which equates to 71.1 millions homes. Breakdown of pet ownership in the U.S. according to the 2007-2008 National Pet Owners Survey: number of U.S. households that own a pet (millions) as cat is 38.4 and dog is 44.8. In 1988, the first year the survey was conducted, 56% of U.S. households owned a pet as compared to 63% in 2006.

People all over the world, across the continents, regions, countries, religions pamper them. We bring them wherever we go. We surprise them with something new on special occasions. They now even get holiday presents. They are our pets!

From high-end items to high-tech items, products for our companion animals now extend beyond traditional necessities. The American Pet Product Manufacturers Association (APPMA) published top pet product trends for 2007. According to this new trend, more and more companies traditionally know for human products are going to the dogs, and cats, and reptiles. Big name companies including like Paul Mitchell, Omaha Steaks, Origins, Harley Davidson and Old Navy are now offering lines of pet products ranging from dog shampoo, pet attire, and name-brand toys to gourmet treats and food.

Many hotels across the country are adopting pet friendly policies. Several chains have announced new pet-friendly policies that include everything from oversized pet pillows, plush doggie robes, to check-in gift packages that include a pet toy, dog treat, ID tag, bone and turn down treat. Some even have a licensed dog masseuse on staff.

Shopping for pet products is becoming easier than ever with an increasing variety of retail outlets now selling pet products. Right along side fertilizer and shovels, shoppers can now find pet products such as doggie doors and yellow lawn spot removers sold at many lawn and garden stores, nurseries, and major home improvement stores including Home Depot.

High-end items to spoil companion animals are must-haves for pet owners that spare no expense to please their furry, feathered and finned best friends. Items include faux mink coats for cold weather outings, feathered French day beds for afternoon naps, designer bird cages, botanical fragrances and to top it all off, a rhinestone tiara!

Pet-owners take grooming one step beyond a haircut, a quick bath and a nail trim. Mouthwash and an electric toothbrush for canines are routine steps in a beauty session for some pooches. Birds receive daily pedicures with special cage perches, while others enjoy manicures complete with nail polish. Pet-owning homes stay cleaner with automatic, self-flushing litter boxes, cleaning cloths for muddy paws that mimic traditional baby wipes, and scented gel air fresheners to keep rooms free of pet odors.

Today's pet foods include complete and balanced diets that tantalize our pets' taste buds and satisfy their tummies. Formulas for puppies and kittens, specialized meals for reptiles, birds and fish and diets for senior pets ensure a long and healthy life for our beloved companions.

High-tech products including computerized identification tags, digital aquarium kits, automatic doors and feeders, enhanced reptile terrarium linking systems and touch-activated toys help pet-owners take care of companion animals with ease and precision.

As pet owners meditate in yoga class, cats relieve stress by frolicking in a toy gym or relaxing in a feline spa before enjoying herbal catnip packaged in a tea bag. Dogs sip fresh water from flowing fountains after a soothing rub with a doggie massager.

Products designed with convenience in mind lead this trend. Programmable feeding and drinking systems, automatic and battery-operated toys, self-cleaning litter boxes and self-warming pet mats let pets virtually care for themselves!

Faux mink coats, hipster lumberjack vests, designer plaid jackets, matching jeweled and leather collar and leash sets, Halloween costumes, and holiday outfits keep pets in fashion throughout the year. Upscale leather carriers complete with a cell phone and water bottle holder are the perfect accessories to keep the pet owner in style as well.

Whether it's a quick trip to the supermarket or a long ride to the beach, companion animals are now traveling animals too. Buckled up in a harness, seat belt system or a portable carrier, these pets stay safe and secure while on the road. Food and water along with safety supplies are on hand in all-in-one kits, waste disposal systems make for easy clean-up on quick stops and motion sickness aids are available too.

From monogrammed sweaters and personalized food and water bowls to digitized collar tags and hand-made treats, owners embrace their pets as true members of the American family celebrating their fluffy, finned and feathered companions with their very own belongings.

Pets provide us with many health benefits. For example, pets help to lower blood pressure. A recent study at the State University of New York at Buffalo found that people with hypertension who adopted a cat or dog had lower blood pressure readings in stressful situations than did those who did not own a pet. (Dr. Karen Allen, State University of New York at Buffalo). Additionally, pets help to reduce stress as walking with a pet helps to sooth nerves and offers instant relaxation, Studies conducted worldwide have shown that the impact of a stressful situation is lesser on pet owners, especially males, than on those who do not own a pet. (Josephine M. Wills, Waltham Centre for Pet Nutrition, United Kingdom). Pets also help to prevent heart disease because pets provide people with faithful companionship, research shows they may also provide their owners with greater psychological stability, thus a measure of protection from heart disease. (National Institute of Health Technology Assessment Workshop: Health Benefits of Pets). In addition, pets help to lower health care costs. People with pets actually make fewer doctor visits, especially for non-serious medical conditions. (National Institute of Health Technology Assessment Workshop: Health Benefits of Pets). Finally, pets help to fight depression. Pets help fight depression and loneliness, promoting an interest in life. When seniors face adversity or trauma, affection from pets takes on great meaning. Their bonding behavior can foster a sense of security. (Between Pets and People: The Importance of Animal Companionship).

An average of seventy five percent family pets visit veterinary clinic every year for treatment. Forty percent of all vet fees come from unforeseen illnesses or accidents. Only 20% of family pets are covered by pet insurance. The average vet bill for attention and care needed following a road accident involving a cat or dog last year was a around $1000 to $1,500. Of course, the statistics is scary.

Traveling in a vehicle with a dog or cat can pose a serious danger to the pet. In an accident, a pet—like a person—can exert a force of 20 times its body weight if it is not properly restrained. Should another passenger collide with a pet, serious, life-threatening injuries can result to both occupants. Even worse, a dog or cat can be thrown from a vehicle in a collision. For pet safety during their travel in a vehicle, use of a variety of pet containers or harnesses types and designs is known in the prior art. Several of these known pet containers or harnesses comprise familiar, expected and obvious structural configurations, notwithstanding the myriad of designs encompassed by the many of such pet containers or harnesses which have been devised to fulfill numerous objectives and requirements associated with pet travel in a vehicle.

While these solutions fulfill their respective, particular objectives and requirements, many known pet restraining container or harness systems fail to disclose a way for easier use in a vehicle for safely securing a pet. More particularly, such known solutions do not enable a safe and secure environment for a pet traveling in a vehicle during a collision of the vehicle as is otherwise available to human occupants of the vehicle. When the pet is traveling within the vehicle, these known solutions to the pet safety during their travel in a vehicle fail to safely and controllably restrain a pet during a collision or sudden breaking of the vehicle.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a safety restrainer is provided for securing a pet in a vehicle having a seat belt with a first prong configured to latch into a first buckle of a shoulder/lap belt combination system. The safety restrainer may comprise a restraint assembly including a restraint strap having a first strap end undo second strap end which are configured to releasably couple to each other. The safety restrainer may further comprise a harness configured to couple to the restraint assembly, the harness having a first harness end and a second harness end, wherein the first harness end having a first connector to releasably couple to the first prong and the second harness end having a second connector to releasably couple to the first buckle, wherein the harness includes first and second harness portions, wherein the first harness portion being the length of strap between the first harness end and the second harness end, wherein the first harness portion having an intermediate point which is fixedly affixed to the second harness portion that is in turn coupled between the intermediate point of the first harness portion and an intermediate point of the restraint strap between the first strap end and the second strap end such that the second harness portion is fixedly affixed to the restraint strap, wherein the second harness portion being the length of strap between the intermediate point of the first harness portion and the intermediate point of the restraint strap.

In another embodiment of the present invention, a kit for the safety restrainer comprising the restraint assembly and the harness is provided.

In another embodiment of the present invention, a detachable safety belt is provided for use in a vehicle with a shoulder/lap belt combination seat belt system including a first buckle and a first prong to securely restrain a pet. The detachable safety belt comprises a restraint strap configured to removably couple to the torso of the pet for restricting movement of the pet in response to an impact force that the vehicle to experience during at least one of a collision of the vehicle or sudden braking of the vehicle. The detachable safety belt further comprises a harness configured to couple to the restraint strap, the harness having a first connector and a second connector adapted to releasably couple to the first prong and first buckle of the shoulder/lap belt combination seat belt system respectively, wherein the harness includes a first harness portion between a first harness end and a second harness end and wherein the first harness portion has a first distance from the first harness end and a second distance from the second harness end, and wherein the second distance is greater than the first distance, wherein the first harness portion being the length of strap between the first and second harness ends, wherein the first distance being the length of strap between the first harness end and a first strap end of the first harness portion, which is being coupled to the restraint strap and the second distance being the length of the strap between the second harness end and a second strap end of the first harness portion, which is being coupled to the restraint strap.

In yet another embodiment of the present invention, a kit for the detachable safety belt comprising the restraint strap and harness is provided.

In yet another embodiment of the present invention, a detachable pet safety belt kit is provided for use with a vehicle shoulder/lap belt combination seatbelt system including a first buckle and a first prong. The kit comprises a restraint strap having a coupling member. The restraint strap configured to removably couple to a torso of a pet such that the coupling member enables leashing of the pet. The kit comprises a harness configured to couple to the restraint strap, the harness having a first harness length with a first free harness end and a second harness length with a second free harness end, the first free harness end coupled to a first connector and the second free harness end coupled to a second connector such that the first and second connectors are adapted to releasably couple to the first prong and the first buckle of the seatbelt system respectively, wherein the harness includes a harness portion having first and second harness ends such that the first harness end of the harness portion is fixedly attached to the first and second harness lengths and the second harness end of the harness portion having a securing member configured to couple to the coupling member of the restraint strap.

BRIEF DESCRIPTION OF THE DRAWINGS

The invention may be understood by reference to the following description taken in conjunction with the accompanying drawings, in which like reference numerals identify like elements, and in which.

Figure 1:
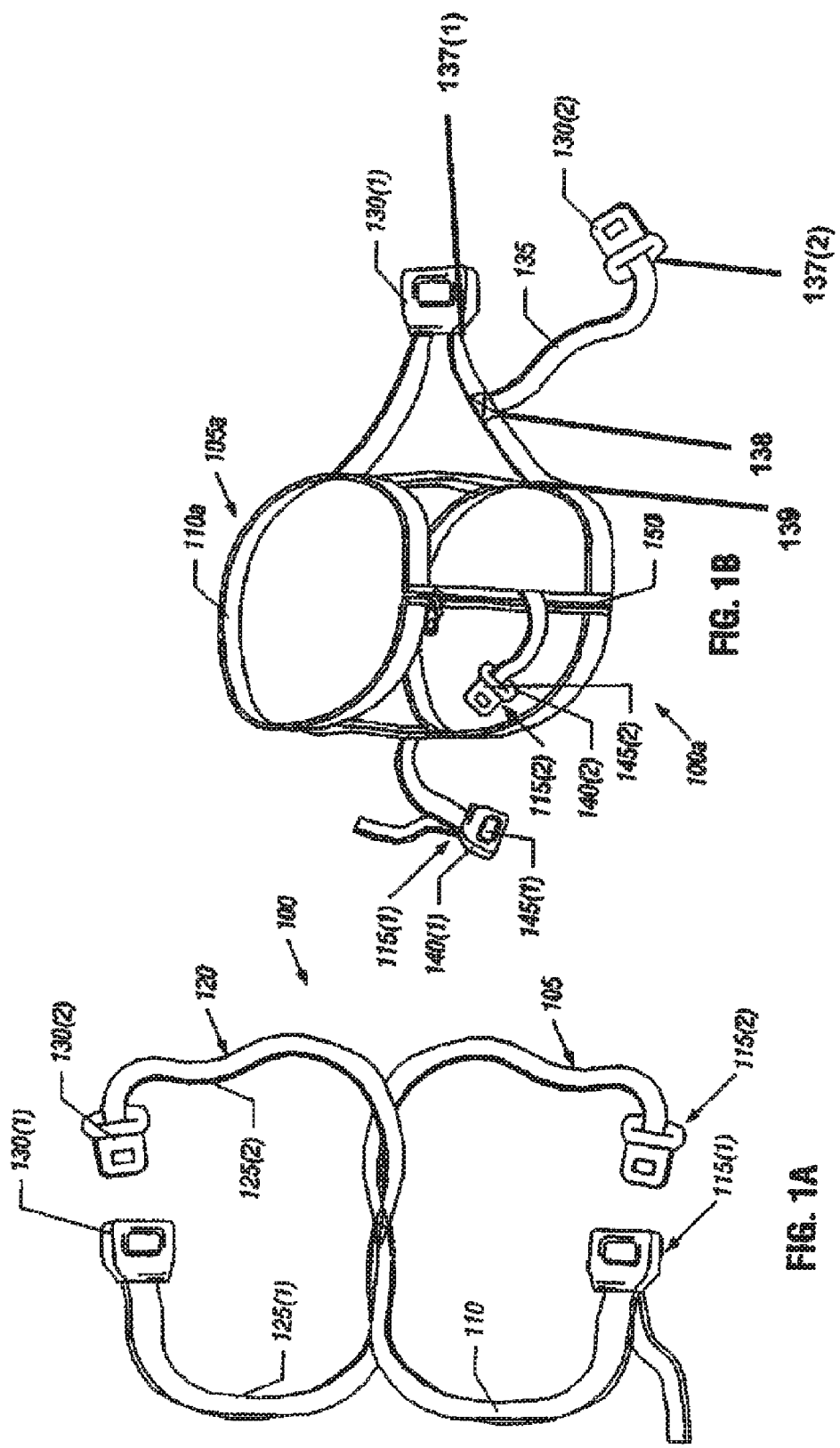
FIG. 1A schematically illustrates a safety restrainer for securing a pet in a vehicle having a seat belt with a first seat belt prong to latch into a first seat belt buckle in accordance with one exemplary embodiment of the present invention.
FIG. 1B schematically illustrates a safety belt for use in a vehicle having a seat belt system including a first buckle and a first prong to securely restrain a pet consistent with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and apparatus are provided for restraining a pet by safely securing the same within a vehicle according to one embodiment of the present invention. More particularly, a safety restrainer is described for controllably restraining a pet during a collision or sudden braking when traveling in the vehicle having a seat belt with a buckle and a prong. Such a pet restraining harness system arrangement may be utilized for restraining a pet traveling in a vehicle having a seat belt with a buckle and a prong consistent with one embodiment of the present invention. The general purpose of the embodiments of the present invention will be described subsequently in greater detail. In this respect, before explaining at least one embodiment of the invention in detail, it is to be understood that the present invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. The abstract is neither intended to define the invention of the application, which is measured by the claims, nor is it intended to be limiting as to the scope of the invention in any way.

Embodiments of the present invention may provide a safety pet restraining system which may be easily and efficiently manufactured and marketed. Embodiments of the present invention may also provide a safety pet restraining system which is of a durable and reliable construction.

Embodiments of the present invention may provide a safety pet restraining system which is susceptible of a low cost of manufacture with regard to both materials and labor, and which accordingly is then susceptible of low prices of sale to the consuming public, thereby making such safety pet restraining system economically available to the buying public. Embodiments of the present invention may provide a safety pet restraining system which provides in the systems and methods of the prior art some of the advantages thereof, while simultaneously overcoming some of the disadvantages normally associated therewith. Embodiments of the present invention may provide a safety pet restraining system for restraining a pet traveling in a vehicle having a seat belt with a buckle and a prong. Embodiments of the present invention may provide a safety pet restraining system that restricts movement of a pet in the vehicle making transporting a pet more enjoyable.

Embodiments of the present invention may provide a safety belt for protecting a pet traveling in a vehicle that is involved in a collision. The pet is secured to the interior of the vehicle preventing the pet from being injured by being thrown about the interior of the vehicle or from being thrown from the vehicle. The present invention also protects a passenger traveling in the vehicle from being injured by a pet that is thrown about the interior of the vehicle.

Referring to FIG. 1A, a safety restrainer 100 is illustrated for securing a pet in a vehicle having a seat belt (not shown) with a first seat belt prong that latches into a first seat belt buckle in accordance with one exemplary embodiment of the present invention. The safety restrainer 100 may comprise a restraint assembly 105 including a restraint strap 110 removably couplable to a body portion (not shown) of the pet. The restraint assembly 105 may be positionable about the body of the pet and the restrain strap 110 positionable between a pair of fore legs and a pair of hind legs of the pet. A suitable structural form of a restraint assembly is disclosed in U.S. Pat. No. 6,564,749, entitled "Pet Restraining Harness System" and is incorporated herein by reference its entirety.

The restraint strap 110 may include a first strap end 115(1) and a second strap end 115(2) being releasably couplable to each other such that the restraint strap 110 forms a loop having a hole when the first and second strap ends 115 (1,2) are releasably coupled together. The safety restrainer 100 may further comprise a harness 120 coupled to the restraint assembly. The harness 120 may be releasably couplable to the seat belt of the vehicle for flexibly restraining the pet. The harness 120 may include a first harness end 125(1) and a second harness end 125(2). The first harness end 125(1) having a second seat belt buckle 130(1) for releasably coupling to the first seat belt prong (not shown) and the second harness end 125(2) having a second seat belt prong 130(2) for releasably coupling to the first seat belt buckle (not shown). A suitable structural form of a restraint strap and a harness is disclosed in U.S. Pat. No. 5,628,548, entitled "Vehicular Passenger Restraint Systems" and is incorporated herein by reference in its entirety.

Turning now to FIG. 1B, a safety belt 100a is schematically illustrated for use in a vehicle having a seat belt system (not shown) including a first buckle and a first prong to securely restrain a pet during a collision of the vehicle and/or sudden braking of the vehicle consistent with one illustrative embodiment of the present invention. For the safety restrainer 100 or the safety belt 100a, the second seat belt buckle 130(2) to couple to a leash 135 for flexibly restricting movement of the pet in the vehicle when coupled to the first seat belt prong.

According to one embodiment of the present invention, the first strap end 115(1) of a restraint strap 110a may comprise an adjustable coupling member 140(1) and the second strap end 115(2) may comprise a securing member 140(2) for coupling each of the strap ends of the restraint strap 110a together such that the restraint strap 110a is adjustably restrictable about the body of the pet. In this way, the restraint strap 110a may safely protect the pet while the safety belt 100a controllably restrains movement of the body of the pet in response to at least one of a collision of the vehicle or sudden braking of the vehicle by using the seat belt system. The adjustable coupling member 140(1) may comprise a user operable buckle 145(1) to adjust the length of the restraint 110a and the securing member 140(2) may comprise a prong 145(2) to couple with the user operable buckle 145(1). This coupling may restrict movement of the torso of the pet in response to an impact force that the vehicle may experience in the event of a collision or sudden braking.

In one embodiment of the present invention, to provide further safety to the pet by avoiding severe bodily injury to the pet, the restraint assembly 105a may further comprise a zipper 150. The zipper 150 may enable a relatively secure grip of the pet's body by the safety belt 100a in addition to evenly distributing the impact of forces on the body of the pet during an accident such as a collision or sudden braking.

Figure 2:
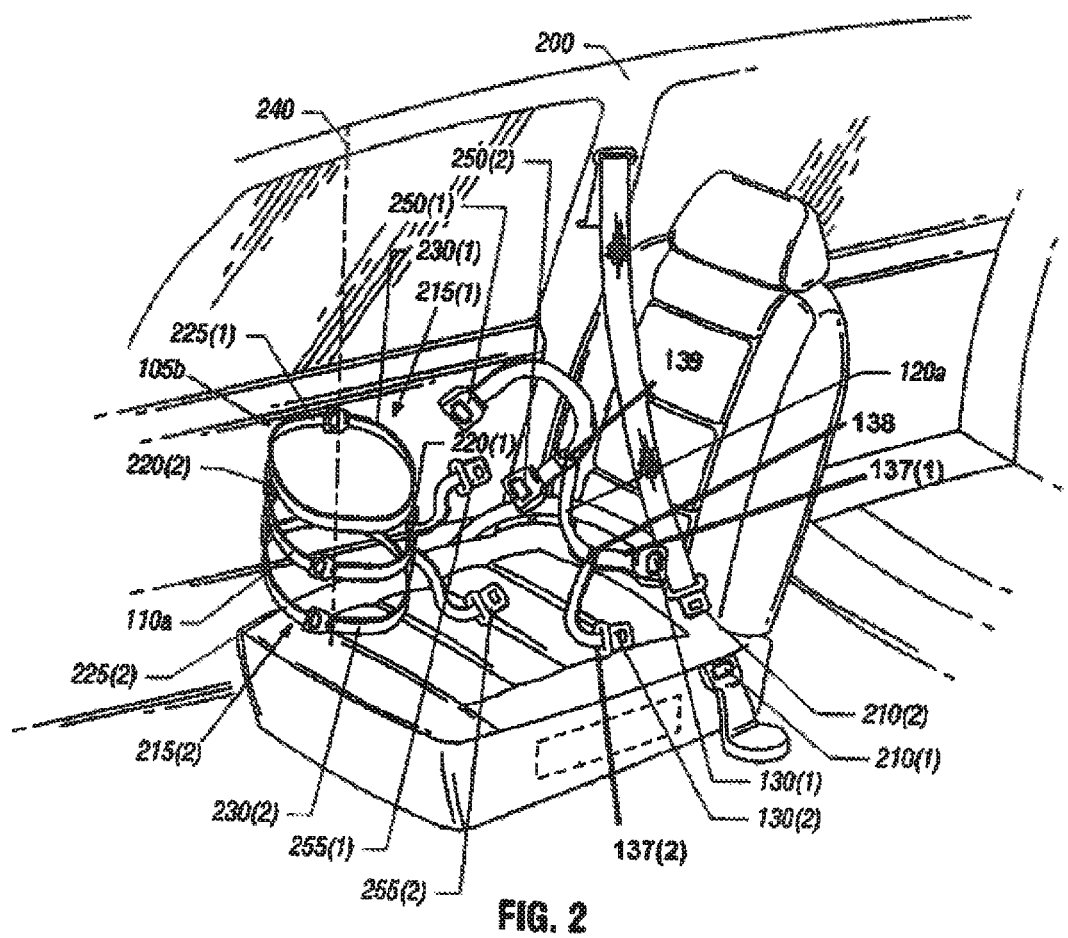
FIG. 2 schematically illustrates the safety belt for use in a vehicle having a seat belt system including a first buckle and a first prong to securely restrain a pet during a collision of the vehicle and/or sudden braking of the vehicle consistent with one illustrative embodiment of the present invention.

Referring to FIG. 2, it schematically illustrates the safety belt 100a of FIG. 1B for use in a vehicle 200 having a seat belt system including a first buckle 210(1) and a first prong 210(2) to securely restrain a pet (not shown) during a collision of the vehicle 200 and/or sudden braking of the vehicle 200 consistent with one illustrative embodiment of the present invention. A suitable seat belt system is disclosed in U.S. Pat. No. 7,204,334, entitled "Occupant Restraint System" and is incorporated herein by reference in its entirety.

The restraint assembly 105b further includes an upper restraint strap 215(1) being positionable about the body of the pet and positionable adjacent to the pair of fore legs of the pet. The restraint assembly 105b further comprises a lower restraint strap 215(2) being positionable about the body of the pet and positionable adjacent to the pair of hind legs of the pet. The restraint strap 110a being positionable between the upper and lower restraint straps 215(1,2) on the body of the pet.

Consistent with one embodiment of the present invention, the restraint assembly 105b further comprises a pair of side straps 220(1,2) for coupling each of the restraint strap 110a, upper restraint strap 215(1) and lower restraint strap 215(2) together. Each of the side straps 220(1,2) may be coupled to and extend between each of the restraint strap 110a, upper restraint strap 215(1) and lower restraint strap 215(2). Each of the upper and lower restrainer straps 215(1,2) having a first end 225(1,2) and a second end 230(1,2) being releasably couplable to each other such that each of the upper and lower restraint straps 215(1,2) form a loop having a hole when ends of each of the upper and lower restraint straps 215(1,2) are releasably coupled together. Each of the holes of the loops being aligned with each other around a common axis 240 when the ends of the each of the upper restraint strap 215(1), lower restraint strap 215(2) and the first 115(1), second strap ends 115(2) of the restraint strap 110a are releasably coupled together.

Referring FIGS. 1B and 2, a first harness portion refers to the length of strap between the second seat belt buckle 130(1) and the seat belt prong 130(2). A point marked as "X" between a first harness end (137(1)) and a second harness end (137(2)) is shown to be an intermediate point (138) of the first harness portion. The first harness portion has a first distance from the intermediate point (138) to the first harness end (137(1)) and a second distance from the intermediate point (138) to the second harness end (137(2)). A second harness portion refers to the length of strap between the intermediate point (138) and a point where the second harness portion couples to the restraint strap shown to be an intermediate point (139) of the restraint strap 110a.

Each of the upper and lower restrainer straps 215(1,2) include a pair of coupling members for coupling each of the ends of the upper and lower restraint straps 215(1,2) together. Each of the pair of coupling members may include a first coupling portion coupled to the second ends 230(1,2) of the upper and lower restraint straps 215(1,2) and a second coupling portion coupled to the first ends 225(1,2) of the upper and lower restraint straps 215(1,2). The first and second coupling portions may be releasably coupled together. Each of the pair of coupling members may comprise a buckle and a prong.

In accordance with one embodiment of the present invention, the safety belt 100a may further comprise a third and fourth buckles 250(1,2) to latch into a mating third and fourth prongs 255(1,2), respectively. In this way, a different type or sizes of the restraint assembly 105b may be detachably coupled to a harness 120a. For example, one type and/or size of the restraint assembly 105b may be suited for a first pet such as dogs and another type and/or size of the restraint assembly 105b may be suited for a second pet such as cats.

One example of the safety belt 100a may be a detachable safety belt for use in the vehicle 200 with the seat belt system by using the first buckle 210(1) and the first prong 210(2) to securely restrain a pet. The detachable safety belt may comprise the restraint strap 110a removably couplable to the torso of the pet. The restraint strap 110a may define a cover portion of the restraint strap to wrap around a body portion of the pet for restricting movement of the restraint strap 110a on the torso of the pet in response to an impact force that the vehicle 200 to experience during a collision of the vehicle and/or braking of the vehicle 200.

For controllably restraining movement of the body of the pet in response to the impact force, the harness 120a may be coupled to the restraint strap 110a. The harness 120a having the second buckle 130(1) and the second prong 130(2) may releasably couple to the first prong 210(2) and first buckle 210(1) of the seat belt system, respectively. For example, the second buckle 130(1) may be a vehicle seat belt buckle and the second prong 130(2) may be a vehicle seat belt prong.

The restraint strap 110a may comprise a first end and second end being releasably couplable to each other such that a third buckle such as the user operable buckle 145(1) may be coupled to the first end and a mated third prong such as the prong 145(2) may be coupled to the second end for releasably coupling together. The third buckle 145(1) may comprise a user operable lever to adjust the length of the restraint strap 110a. For example, the user operable third buckle 145(1) may be an airplane seat buckle. A suitable prong and buckle are disclosed in U.S. Pat. No. 4,567,629, entitled "Buckle Device," and is incorporated herein by reference in its entirety.

In accordance with one embodiment of the present invention, the restraint strap 110a of the safety belt 100a may further comprise a first end and a second end such that a third buckle coupled to the first end and a fourth buckle coupled to the second end. The cover portion of the restraint strap 110a may comprise a third prong and a fourth prong being releasably coupled to the third and fourth buckles, respectively. The cover portion of the restraint strap 110a may comprise a first end and second end to enable a fastening member for fastening the first end of the cover portion to the second end of the cover portion.

Figure 3:
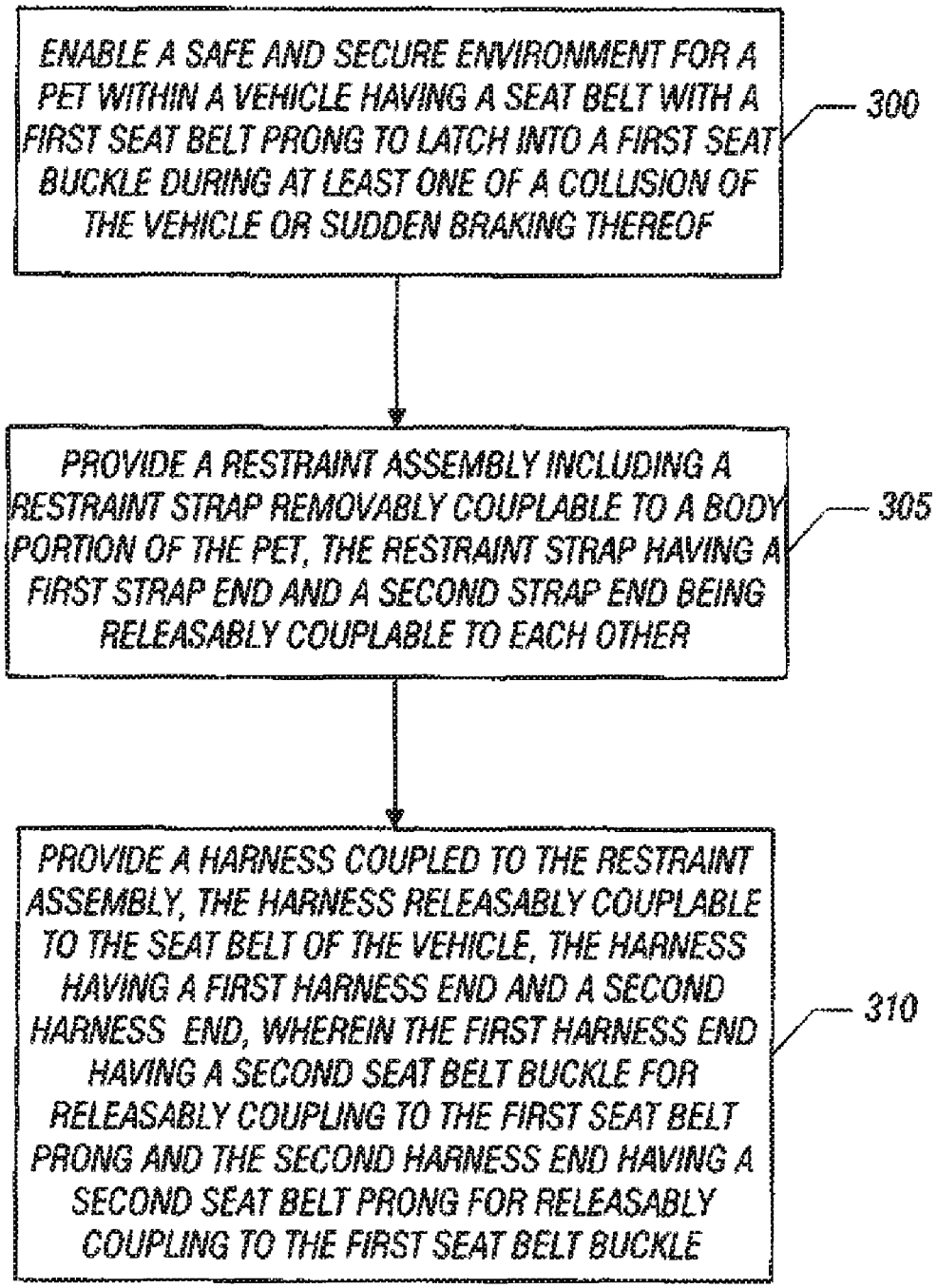
FIG. 3 illustrates a stylized representation of a method of enabling a safe and secure environment for a pet within a vehicle having a seat belt with a first seat belt prong that latches into a first seat belt buckle according to an exemplary embodiment of the present invention.

Referring to FIG. 3, a stylized representation of a method of enabling a safe and secure environment for a pet within the vehicle 200 oho FIG. 2 having a seat belt with the seat belt prong 210(2) that latches into the seat belt buckle 210(1) is illustrated according to an exemplary embodiment of the present invention. At block 300, a safe and secure environment may be enabled for a pet within the vehicle 200 by providing a seat belt with the seat belt prong 210(2) to latch into the seat belt buckle 210(1). At block 305, the restraint assembly 105a may be provided including the restraint strap 110a removably couplable to a body portion of the pet. The restraint strap 110a may comprise a first strap end and a second strap end being releasably couplable to each other.

At block 310, the harness 120a that is coupled to the restraint assembly 105a may be provided such that the harness 120a is releasably couplable to the seat belt of the vehicle 200 for flexibly restraining the pet. The harness 120a may include a first harness end and a second harness end with the first harness end having a second seat belt buckle for releasably coupling to the first seat belt prong and the second harness end having a second seat belt prong for releasably coupling to the first seat belt buckle. In this way, by removably coupling the restraint strap 110a to the torso of the pet, the pet may be flexibly secured within the vehicle 200 during either a collision of the vehicle 200 or a sudden braking of the vehicle 200 by use of both the ends of the seat belt typically provided to operate with the seat belt system.

Consistent with one embodiment of the present invention, each of the upper and lower restraint straps 215(1,2) may comprise a generally flexible material such as a cloth webbing or leather material or synthetic nylon type material. Likewise, each of the side straps, restraint strap 110a, harness 120a that is coupled to the restraint assembly 105a may comprise a generally flexible material such as a cloth webbing or leather material or synthetic nylon type material. Each of the prong being removably insertable into the buckle may comprise metal and/or plastic configured in a manner such that the seat belt prong 210(2) typically latches into the seat belt buckle 210(1).

In use, the restraint assembly 105b is positioned around the body of the pet. The fastening restraint strap 110a, the upper and lower restraint straps 215(1,2) and the side straps may be adjusted to fit around the body of the pet. Use of both the prong and the buckle of the seat belt with the safety restrainer 100 or the safety belt 100a may flexibly restrict movement of the pet around an interior of the vehicle 200 in a manner similar to that of human occupants of the vehicle 200 during an accident or sudden jerk from braking or otherwise.

Figure 4:
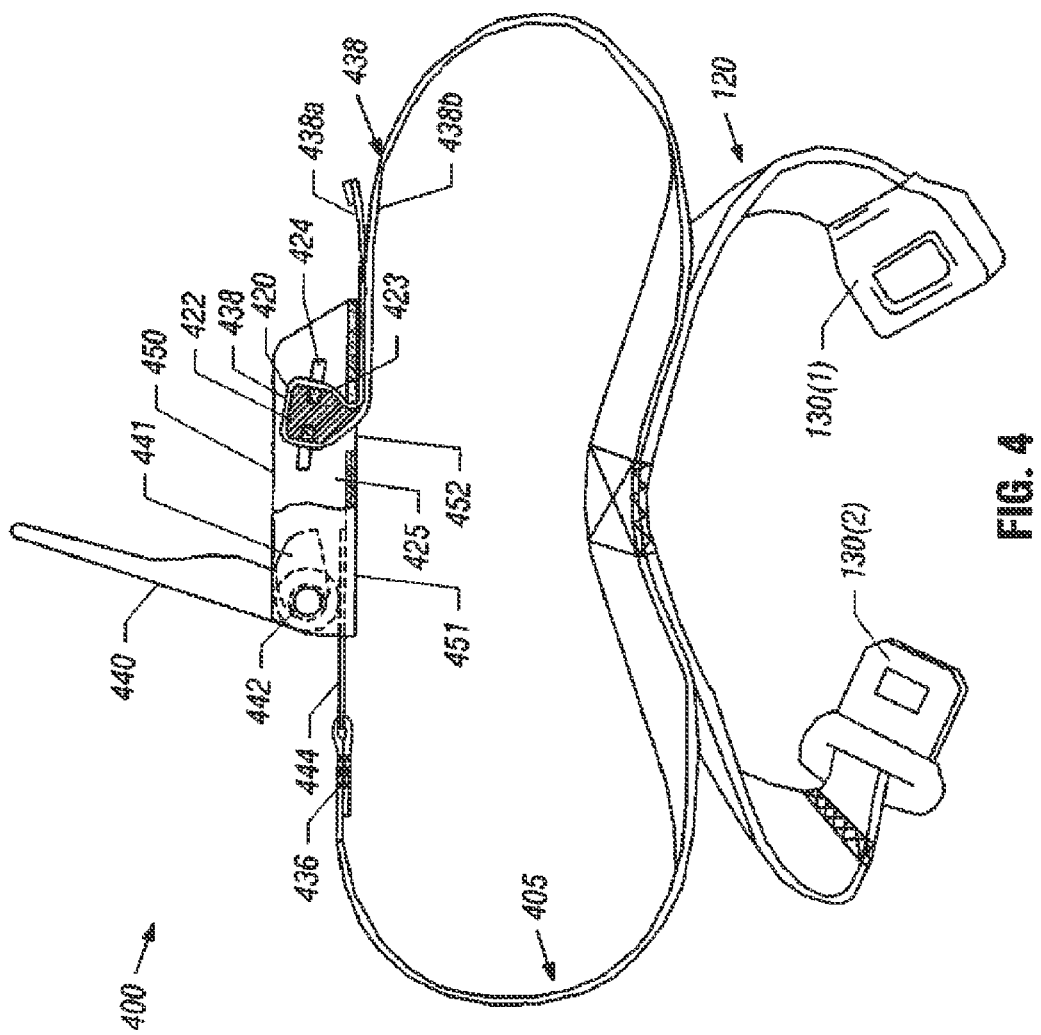
FIG. 4 schematically illustrates a detachable seat belt for use with a pet in a vehicle having a passenger seat belt system including a vehicle seat belt prong and a vehicle seat belt buckle in accordance with one exemplary embodiment of the present invention.

FIG. 4 schematically illustrates a detachable seat belt 400 for use with a pet in the vehicle 200 having a conventional passenger or vehicle or occupant seat belt system including the vehicle seat belt prong 210(2) the vehicle seat belt buckle 210(1) in accordance with one exemplary embodiment of the present invention. The detachable seat belt 400 may comprise the harness 120 configured to releasably couple to the vehicle seat belt prong 210(2) and the vehicle seat belt buckle 210(1) of the passenger seat belt system. The detachable seat belt 400 may further comprise a seat belt webbing 405 coupled to the harness 120. The seat belt webbing 405 may include a first side length 436 having a first prong 444 attached thereto and a second side length 438 having a first buckle 450 combined with a webbing adjuster 420 for adjusting and locking the seat belt webbing 405. In this way, when the seat belt webbing 405 is buckled and adjusted snugly across a torso of a pet, the detachable seat belt 400 may hold the pet safely on a vehicle seat during at least one of a sudden deceleration of the vehicle 200 or in response to an impact force that the vehicle 200 to experience in a collision. A suitable webbing and an adjuster including the seat belt webbing 405 and the webbing adjuster 420 for the detachable seat belt 400 is disclosed in U.S. Pat. No. 5,088,160, entitled "Lap Belt Webbing Adjuster" and is incorporated herein by reference in its entirety.

Seat belt restraint systems used in vehicles to protect the occupant in the event of sudden decelerations are generally known. In particular, seat belt webbing adjusters are used in aircraft passenger lap seat belts. For example, a lap seat belt, when buckled and adjusted snugly across the waist of the passenger, holds a passenger safely within a seat during sudden decelerations of a vehicle. A typical aircraft passenger lap seat belt consists of two lengths of seat belt webbing, each anchored to the seat at one end, one webbing (here selected to be the left side length) having a buckle connector attached to its free end, and the other webbing (here selected to be the right side length) having a combined buckle and webbing adjuster attached to it so that the buckle connector fits into and releasably locks with a buckle to join the two side lengths of webbing together and form the seat belt.

The webbing adjuster includes a moveable load bar in a base frame. The free end of the right side length of webbing is inserted through a slot in the bottom of the base frame, wound around the load bar, and then passed back through the slot to exit the webbing adjuster. With no tension in the webbing, the webbing adjuster is aid to be in the adjustment mode and the length of belt webbing may be adjusted by pulling on the free end of the webbing.

When heavy loads are suddenly applied to the webbing adjuster, as in deceleration during landing or crash situations, the load bar rotates further counter-clockwise, pinching and joggling the loose webbing around the end of the bar and through a close series of very tight 90 degree bends, until the webbing is clinched between the notch and the body and web lock occurs.

Other typical configurations and arrangements of seat belt adjusters seen in the prior art and in the marketplace are disclosed in U.S. Pat. Nos. 3,118,208, 3,576,056, 4,366,604 and 4,679,852.

The seat belt webbing 405 and the webbing adjuster 420 may be suitably adapted for use with the detachable seat belt 400 for pets. The operation of the webbing adjuster 420 of for a pet is the same as described above for aircraft passenger webbing adjusters. The webbing adjuster 420 utilizes a load bar of unique shape which provides a plurality of webbing pressure or friction generating edges which are able to grab and securely hold the set belt webbing 405 under severe load conditions.

The seat belt webbing 405 and the webbing adjuster 420 may better grip the set belt webbing 405 during normal usage and most importantly during rapid deceleration as in sudden braking or crash conditions. The webbing adjuster 420 securely grip and lock the set belt webbing 405 during crash conditions, while at the same time providing for the easy release of the webbing when the webbing adjuster 420 is moved to its adjustment mode.

Referring to FIG. 4, it shows the detachable seat belt 400 including a buckle such as the first buckle 450 and a buckle connector such as the first prong 444 joining together the webbing 436 on one side and webbing 438 on the other side to form the detachable seat belt 400. The buckle 450 includes a base frame 451 having side flanges 425 in which the webbing adjuster 420 is mounted. Also shown therein are the buckle cover 440 and accompanying latch assembly including the ratchet 441 and spring 442 which are mounted about shaft 443 to releasably engage the first prong 444. The webbing adjuster 420 includes the load bar 422 slideably supported in canted slots 424 of the upstanding side of flanges 425 by means of two keepers 423 located at opposite ends of the load bar 422.

As may be seen in FIG. 4, installation of the webbing 438 is readily accomplished by inserting the free end of the webbing 438A through slot 452 in the bottom of the base frame 451, by passing the webbing clockwise first up on the left side of load bar 422, then over its top, and then down on its right side, and finally back through base frame slot 452 to exit the base frame 451. Sufficient webbing 438 must be pulled through the webbing adjuster 420 to provide a good handhold on the free end of the webbing designated as 438A.

Consistent with one embodiment of the present invention, for the detachable seat belt 400 the harness 120 may be configured to form a loop that releasably couples to the passenger seat belt system when the vehicle seat belt prong 210(2) passes through the loop before coupling to the vehicle seat belt buckle 210(1) such that when the seat belt webbing 405 is buckled and adjusted snugly across a torso of a pet the detachable seat belt 400 to hold the pet safely on a vehicle seat during at least one of a sudden deceleration of the vehicle 200 or in response to an impact force that the vehicle 200 to experience in a collision.

According to one embodiment of the present invention, the harness 120 may include the first harness end 125(1) and the second harness end 125(2). At the first harness end 125(1), a second prong or buckle attached thereto and at the second harness end a second buckle or prong attached thereto for releasably coupling the seat belt webbing 405 to the passenger seat belt system such that when the seat belt webbing 405 is buckled and adjusted snugly across a torso of a pet the detachable seat belt 400 to hold the pet safely on a vehicle seat during at least one of a sudden deceleration of the vehicle 200 or in response to an impact force that the vehicle 200 to experience in a collision.

For example, the second prong at the first harness end 125(1) configured to releasably couple to the vehicle seat belt buckle 210(2) and the second buckle at the second harness end 125(2) adapted to releasably couple to the vehicle seat belt prong 210(1).

In accordance with one embodiment of the present invention, the first buckle such as the buckle 450 may further comprise the buckle cover 440 for use with the webbing adjuster 420 for lengthening and shortening the seat belt webbing 405. The webbing adjuster 420 may securely grip and lock the seat belt webbing 405 during the at least one of a sudden deceleration of the vehicle 200 or in response to an impact force that the vehicle 200 to experience in a collision.

In accordance with one embodiment of the present invention, the first prong such as the buckle connector 444 may be configured to fit into and releasably lock with the first buckle or the buckle 450 to join the first side and second side lengths 436, 438 of the seat belt webbing 405 together for forming a pet seat belt. The seat belt webbing 405 having the free end 438A that enables a user to pull a portion 438 of the seat belt webbing 405 through the webbing adjuster 420 for a shortening adjustment of the pet seat belt. Likewise, the seat belt webbing 405 having the free end 438A that enables a user to push a portion 438 of the seat belt webbing 405 through the webbing adjuster 420 for a lengthening adjustment of the pet seat belt. In this way, the seat belt webbing 405 is progressively frictionally gripped by the webbing adjuster 420 for adjusting a length of the pet seat belt.

It is understood that the buckle 450 and the first prong 444 illustrated are standard prior art items which exemplify the manner in which webbing adjusters are presently incorporated into aircraft passenger lap seat belt systems. In practice the webbing adjuster 420 might not be incorporated in the buckle 450 but might be incorporated in the first prong 444 or might be mounted to either side length of webbing 405 independent of the buckle 450 and first prong 444.

Figure 5:
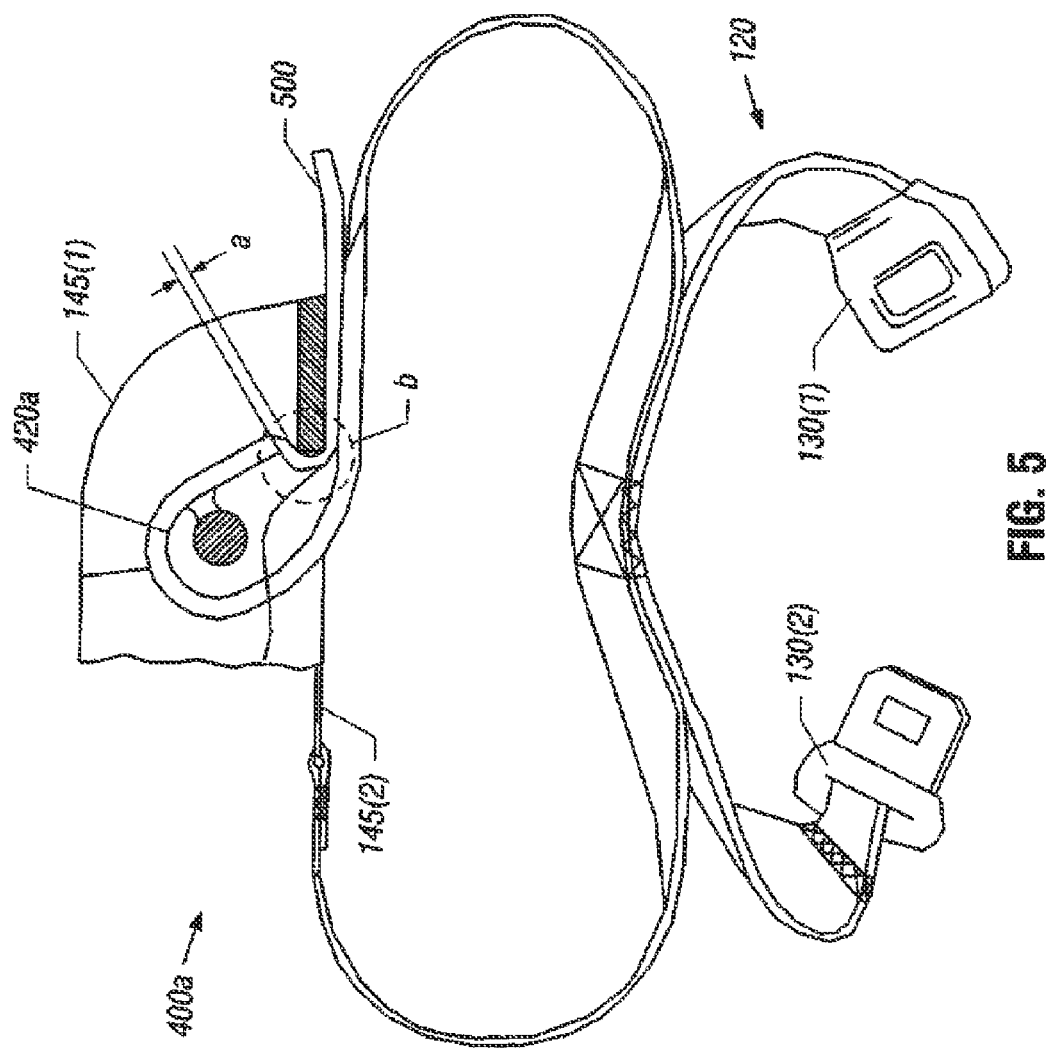
FIG. 5 schematically illustrates a detachable safety belt for use in a vehicle with a vehicle seat belt system including a first buckle at a first end and a first prong at a second end to securely restrain a pet wherein the detachable safety belt comprises an adjustable restraint strap having a webbing adjuster in accordance with one exemplary embodiment of the present invention.

Referring to FIG. 5, a detachable safety belt 400a is schematically illustrated for use in the vehicle 200 with a vehicle seat belt system including the first buckle 210(1) at a first end and the first prong 210(2) at a second end to securely restrain a pet in accordance with one exemplary embodiment of the present invention. The detachable safety belt 400a comprises an adjustable restraint strap 500 having a webbing adjuster 420a.

The detachable safety belt 400a may further comprise the harness 120 coupled to the adjustable restraint strap 500. The harness 120 having the second buckle 130(1) and the second prong 130(2) to releasably couple to the first prong 210(2) and the first buckle 210(1) of the vehicle seat belt system respectively for movably restraining movement of the body of the pet by holding the pet safely in response to an impact force that the vehicle 200 to experience during at least one of a collision of the vehicle 200 or sudden braking of the vehicle 200. The adjustable restraint strap 500 may comprise the third buckle 145(1) coupled to the first end and the third prong 145(2) coupled to the second end for releasably coupling together.

In the detachable safety belt 400a, the third buckle 145(1) may comprise the user operable buckle cover 440 to adjust the length of the adjustable restraint strap 500. For example, the third buckle 145(1) may be an aircraft passenger seat buckle. Likewise, the second buckle 130(1) may be a vehicle seat belt buckle and the second prong 130(2) may be a vehicle seat belt prong.

Figure 6:
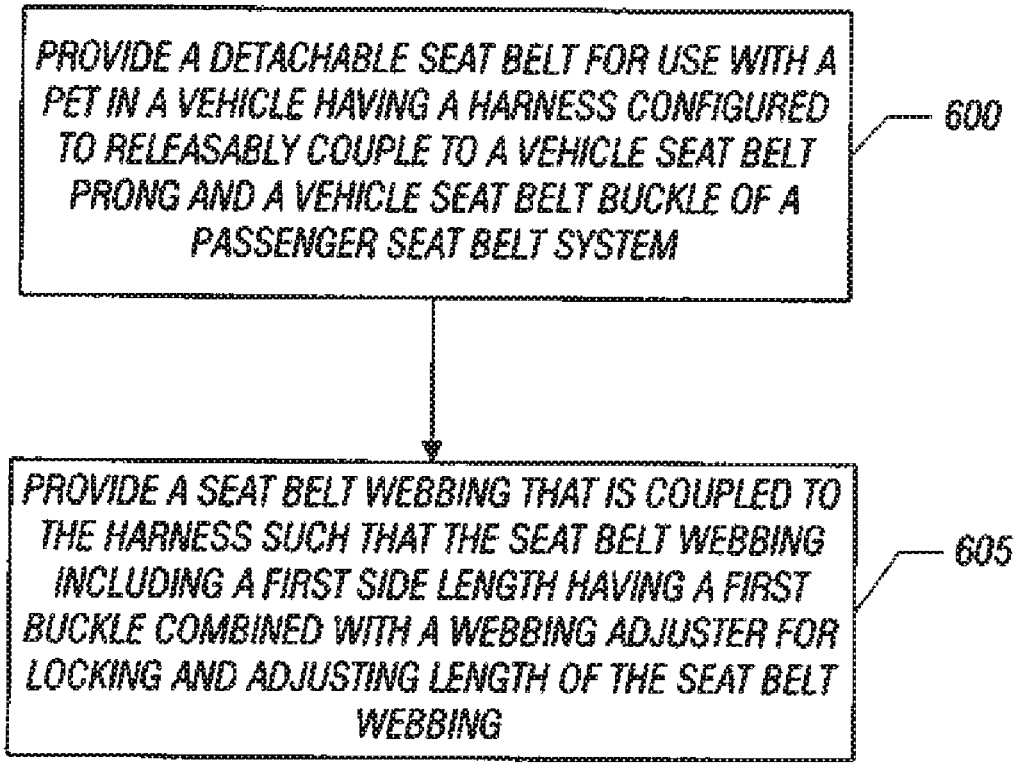
FIG. 6 illustrates a stylized representation of a method of providing a detachable seat belt for use with a pet in a vehicle having a passenger seat belt system including a vehicle seat belt prong and a vehicle seat belt buckle according to an exemplary embodiment of the present invention.

Referring to FIG. 6, it illustrates a stylized representation of a method of providing the detachable seat belt 400 for use with a pet in the vehicle 200 having a passenger seat belt system including the vehicle seat belt prong 210(2) and the vehicle seat belt buckle 210(1) according to an exemplary embodiment of the present invention. At block 600, the harness 120 is provided and configured to releasably couple to the vehicle seat belt prong 210(2) and the vehicle seat belt buckle 210(1) of the passenger seat belt system. At block 605, the seat belt webbing 405 may be provided such that it is coupled to the harness 120. The seat belt webbing 405 may include the first side length 436 having a buckle conn such as the first prong 444 attached thereto. The seat belt webbing 405 may include the second side length 438 having a first buckle such as the buckle 450 combined with the webbing adjuster 420 for adjusting and locking the seat belt webbing 405.

By enabling the webbing adjuster 420 to securely grip and lock the seat belt webbing 405 when the seat belt webbing 405 is buckled and adjusted snugly across a torso of a pet, the detachable seat belt 400 may protect the pet and occupants of the vehicle 200 during the at least one of a sudden deceleration of the vehicle 200 or in response to an pact force that the vehicle 200 to experience in a collision. In one embodiment of the present invention, the harness 120 may be configured to form a loop that releasably couples to the passenger seat belt system when the vehicle seat belt prong 210(2) passes through the loop before coupling to the vehicle seat belt buckle 210(1).

Figure 7:
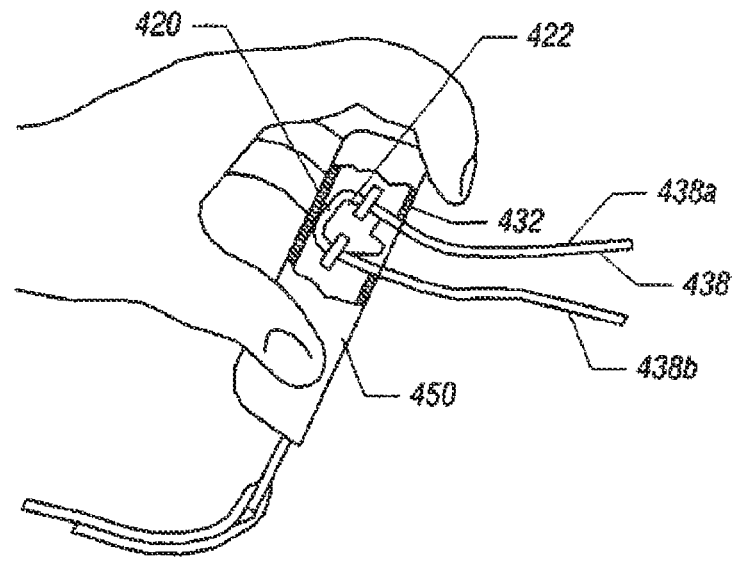
FIG. 7 schematically illustrates a side view, partially in cross-section, of a webbing adjuster assembly in the adjustment mode for lengthening the seat belt webbing according to one embodiment of the present invention.

Referring to FIG. 7, it schematically illustrates a side view, partially in cross-section, of a webbing adjuster assembly in the adjustment mode for lengthening the seat belt webbing 405 according to one embodiment of the present invention. As shown in FIG. 7, when the buckle 450 and the webbing adjuster 420 is rotated to an angle of approximately 50 degree measured between the bottom surface of base frame 451 and anchor end of webbing 438B, tension in anchor end of webbing 438B cannot cause load bar 422 to slide in the direction of bar stop 432 and thus cannot pinch the free end of the webbing 438A. The webbing 438 can then move freely over load bar 422 and the webbing adjuster 420 is said to be in its adjustment mode. Further, pulling on the buckle body 450 in the adjustment mode causes the free end 438A of webbing 438 to slide into the webbing adjuster 420 and around load bar 422 in a counter-clockwise direction, thus increasing the length of the anchored end 438B of the web.

Figure 8:
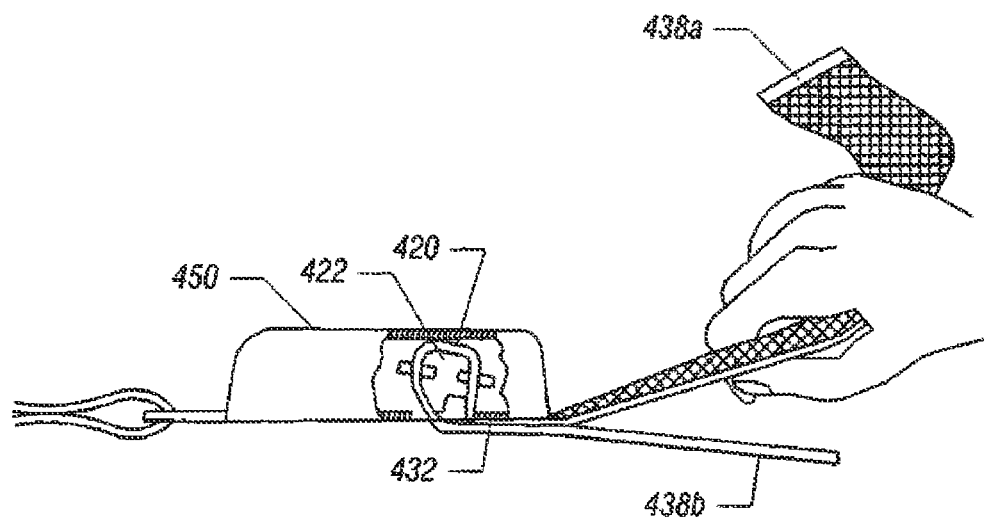
FIG. 8 schematically illustrates a side view, partially in cross-section, of the webbing adjuster assembly shown in FIG. 7 for shortening the seat belt webbing according to one embodiment of the present invention.

Referring to FIG. 8, it schematically illustrates a side view, partially in cross-section, of the webbing adjuster assembly shown in FIG. 7 for shortening the seat belt webbing 405 according to one embodiment of the present invention. As shown in FIG. 8, during the shortening adjustment the user pulls on the free end of the webbing 438A, causing the webbing to flow through the adjuster. Pulling on the free end of the webbing 438A causes the load bar 422 to slide to the left away from the bar stop 432. This prevents excessive loads and wear on the webbing during the shortening adjustment is that the bend angles in the webbing at points I, H, G, and F are of a large radii. These present friction areas which the webbing encounters as it moves in the clockwise direction. Accordingly, the changes in direction for the webbing at those points are slight and prevent the webbing from experiencing high tension loads at those points. As disclosed hereinafter, sharper changes in direction and higher tension loads on the webbing occur at points E, D, C, and A.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art.

It should be borne in mind, however, that all of these and similar terms are to be associated with the appropriate physical quantities and are merely convenient labels applied to these quantities.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A detachable pet safety belt for restraining a pet using a vehicle's shoulder/lap belt combination seatbelt system that includes a seatbelt, first and second belt connectors for an associated vehicle seat of a motor vehicle, the detachable pet safety belt comprising:
   a restraint assembly including first and second distal ends such that near or at the first distal end a first loop is formed and near or at the second distal end a second loop is formed, wherein the first loop is disposed within or around a first lane and the second loop is disposed within or around a second plane such that first and second planes face each other while a longitudinal distance separates the first and second loops, and wherein both the first and second loops are configured to removably fit fully around the torso of the pet; and
   a harness that by coupling to the restraint assembly forms a single component, wherein the harness including a first harness length with a first free harness end and a second harness length with a second free harness end, the first free harness end coupled to a first connector and the second free harness end coupled to a second connector such that the first and second connectors are adapted to releasably couple the harness to the vehicle's shoulder/lap belt combination seatbelt system, each of the first and second connectors having a free end, wherein the first connector is adapted to couple to the first belt connector in a default position thereof during a state of non-operating mode whereas the first belt connector is connected to the vehicle's shoulder/lap belt combination seatbelt system to enable locking of the pet at a desired position on the vehicle seat upon at least one of a vehicle collision, a sudden braking or deceleration and a sudden maneuvering of the motor vehicle, wherein the second connector is adapted to couple to the second belt connector, wherein the first connector is configured and arranged at a first predetermined position so that the restraint assembly is coupled to the first belt connector thereby connecting the restraint assembly to the vehicle's shoulder/lap belt combination seatbelt system and the second connector is configured and arranged at a second predetermined position relative to the first determined position so that the restraint assembly is coupled to the second belt connector, wherein the first and second predetermined positions are selected to align the first and second connectors with the restraint assembly such that the harness to act in conjunction with the restraint assembly to lock the position of the pet at an intermediate point along a longitudinal path between the first belt connector and the second belt connector, and wherein, in use, the restraint assembly has a first distance from the default position of the first belt connector which is configured to be increased or decreased by the vehicle's shoulder/lap belt combination seatbelt system and the restraint assembly has a second distance from the free end of the second connector such that the second distance determines the maximum increase allowable to the first distance.

2. The detachable pet safety belt of claim 1, wherein the first connector is a buckle and the second connector is a prong.

3. The detachable pet safety belt of claim 2, wherein the buckle is a vehicle seatbelt buckle and the prong is a vehicle seatbelt prong.

4. The detachable pet safety belt of claim 1, wherein the first belt connector is a first prong and the second belt connector is a first buckle and the first connector is a second buckle and the second connector is a second prong.

5. The detachable pet safety belt of claim 4, wherein the second buckle is a vehicle seatbelt buckle and the second prong is a vehicle seatbelt prong.

6. The detachable pet safety belt of claim 1, wherein the second harness length is disposed between the restraint assembly and the second connector to enable the harness to couple to the restraint assembly and enable the second connector to couple to the second belt connector.

7. The detachable pet safety belt of claim 1, wherein the first harness length is disposed between the restraint assembly and the first connector to enable the harness to couple to the restraint assembly and enable the first connector to couple to the first belt connector.

8. The detachable pet safety belt of claim 1, wherein the restraint assembly further comprising:

a third connector and the first harness length including a fourth connector at a first harness end, wherein the fourth connector is configured to removably couple to the third connector; and a fifth connector and the second harness length including a sixth connector at a second harness end, wherein the sixth connector is configured to removably couple to the fifth connector.

9. The detachable pet safety belt of claim 1, wherein the restraint assembly having a coupling member and the harness having a securing member configured to couple to the coupling member of the restraint assembly such that the harness is configured to detachably couple to the restraint assembly.

10. The detachable pet safety belt of claim 9, wherein the coupling member includes at least one of third and fourth connectors and the securing member includes at least one of fifth and sixth connectors.

11. A detachable pet safety belt for restraining a pet using a vehicle's shoulder/lap belt combination seatbelt system that includes a seatbelt, first and second belt connectors for an associated vehicle seat of a motor vehicle, the detachable pet safety belt comprising:

a restraint that is configured to be removably worn onto the torso of the pet; and a harness having a harness portion for coupling the harness to the first and second belt connectors and a connecting portion for coupling the harness to the restraint, wherein the harness portion including a first harness length with a first free harness end and a second harness length with a second free harness end, the first free harness end coupled to a first connector and the second free harness end coupled to a second connector such that the first and second connectors are adapted to releasably couple the harness to the vehicle's shoulder/lap belt combination seatbelt systems, each of the first and second connectors having a free end, wherein the first connector is adapted to couple to the first belt connector in a default position thereof during a state of non-operating mode wherein the first belt connector is connected to the vehicle's shoulder/lap belt combination seatbelt system, wherein the second connector is adapted to couple to the second belt connector, wherein the first connector is configured and arranged at a first predetermined position within the harness portion for coupling the restraint to the first belt connector thereby connecting the restraint to the vehicle's shoulder/lap belt combination seatbelt system and the second connector is configured and arranged at a second predetermined position within the harness portion relative to first determined position for coupling the restraint to the second belt connector, wherein the first and second predetermined positions are selected to align the first and second connectors with the restraint such that the harness to act in conjunction with the restraint to enable locking of the pet at a desired position on the vehicle seat upon at least one of a vehicle collision, a sudden braking or deceleration and a sudden maneuvering of the motor vehicle by positioning the pet at an intermediate point along a longitudinal path between the first belt connector and the second belt connector, wherein the first harness length is disposed between the restraint and the first connector to enable the harness to couple to the restraint and enable the first connector to couple to the first belt connector, and wherein the restraint further including a third connector and the first harness length including a fourth connector at a first harness end, wherein the fourth connector is configured to removably couple to the third connector.

12. The detachable pet safety belt of claim 11, wherein the first harness length is disposed between the restraint and the first connector to enable the harness to couple to the restraint and enable the first connector to couple to first belt connector and wherein the second harness length is disposed between the restraint and the second connector to enable the harness to couple to the restraint and enable the second connector to couple to the second belt connector.

13. The detachable pet safety belt of claim 11, wherein the restraint further comprising:
   a fifth connector and the second harness length including a sixth connector at a second harness end, wherein the sixth connector is configured to removably couple to the fifth connector.

14. The detachable pet safety belt of claim 11, wherein the first connector is a buckle that is configured to removably couple to the first belt connector and the second connector is a prong that is configured to removably couple to the second belt connector.

15. The detachable pet safety belt of claim 11, wherein the first connector is a buckle and the second connector is a prong.

16. A detachable seatbelt harness for restraining a pet animal such as a dog using a vehicle's shoulder/lap belt combination seatbelt system that includes a seatbelt, first and second belt connectors for an associated vehicle seat of a motor vehicle, the detachable seatbelt harness comprising:
   a restraint having a loop that is configured to be removably worn onto the torso of the pet animal; and
   a harness for coupling the restraint to the first and second belt connectors; and
   a connecting portion being distinct from the harness and the restraint, wherein the connecting portion is disposed intermediately between the harness and the loop of the restraint to physically separate the harness from the loop of the restraint,
   wherein the harness including a first harness length with a first free harness end and a second harness length with a second free harness end, the first free harness end coupled to a first connector and the second free harness end coupled to a second connector such that the first and second connectors are adapted to releasably couple the harness to the vehicle's shoulder/lap belt combination seatbelt system, each of the first and second connectors having a free end,
   wherein the first connector is adapted to couple to the first belt connector in a default position thereof during a state of non-operating mode wherein the first belt connector is connected to the vehicle's shoulder/lap belt combination seatbelt system, wherein the second connector is adapted to couple to the second belt connector,
   wherein the first connector is configured and arranged at a first predetermined position within the harness for coupling the restraint to the first belt connector thereby connecting the restraint to the vehicle's shoulder/lap belt combination seatbelt system and the second connector is configured and arranged at a second predetermined position within the harness relative to the first determined position for coupling the restraint to the second belt connector, and
   wherein the first and second predetermined positions are selected to align the first and second connectors with the restraint such that the harness to act in conjunction with the restraint to enable locking of the pet animal at a desired position on the vehicle seat upon at least one of a vehicle collision, a sudden braking or deceleration and a sudden maneuvering of the motor vehicle by positioning the pet animal at an intermediate point along a longitudinal path between the first belt connector and the second belt connector.

17. The detachable seatbelt harness of claim 16, wherein the restraint further comprising a third connector and the connecting portion including a fourth connector, wherein the fourth connector is configured to removably couple to the third connector.

18. The detachable seatbelt harness of claim 17, wherein the restraint further comprising a fifth connector and the connecting portion including a sixth connector, wherein the sixth connector is configured to removably couple to the fifth connector.

19. The detachable seatbelt harness of claim 16, wherein the first belt connector is a first prong and the second belt connector is a first buckle and the first connector is a second buckle and the second connector is a second prong.

20. The detachable seatbelt harness of claim 19, wherein the second buckle is a vehicle seatbelt buckle and the second prong is a vehicle seatbelt prong.

* * * * *